United States Patent [19]

Bowman, deceased et al.

[11] 3,934,993
[45] Jan. 27, 1976

[54] GLASSWARE HANDLING AND TREATING EQUIPMENT

[75] Inventors: Edward W. Bowman, deceased, late of Tampa, Fla.; by Muriel B. Bowman, executrix; by Michael Edward Bowman, executor, both of Uniontown, Pa.

[73] Assignee: E. W. Bowman, Incorporated, Uniontown, Pa.

[22] Filed: July 18, 1974

[21] Appl. No.: 489,732

[52] U.S. Cl. .................. 65/60; 65/117; 65/350; 65/351; 118/63
[51] Int. Cl.² .................................... C03C 17/00
[58] Field of Search ....... 65/118, 119, 60, 350, 351; 117/62, 94; 118/63

[56] References Cited
UNITED STATES PATENTS
3,734,765   5/1973   Russell et al. ........................... 65/60

Primary Examiner—Arthur D. Kellogg
Attorney, Agent, or Firm—Donald D. Jeffery

[57] ABSTRACT

Glassware treating apparatus in which bottles which have been coated with a non-abrading coating are treated to remove surface irregularities in the coating on the bottom of the bottles. The bottles are gripped and suspended from conveyor means and pass consecutively over a heating zone, a cooling zone and a drying zone for removing the surface irregularities.

5 Claims, 6 Drawing Figures

U.S. Patent  Jan. 27, 1976  3,934,993
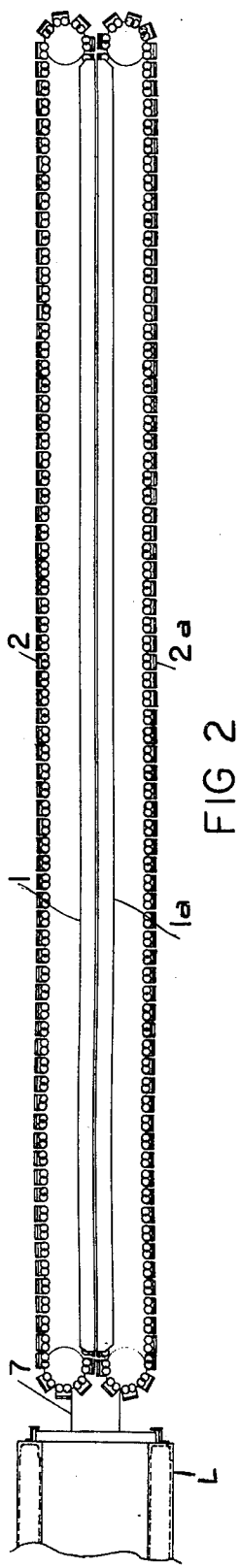
FIG 2
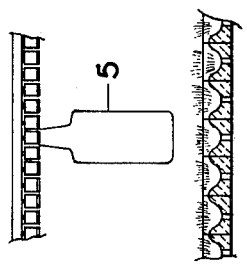
FIG 5
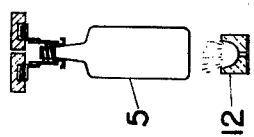
FIG 6
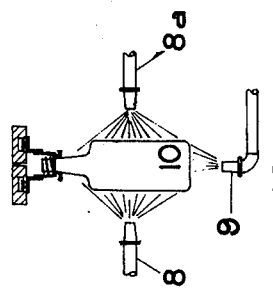
FIG 4
FIG 3
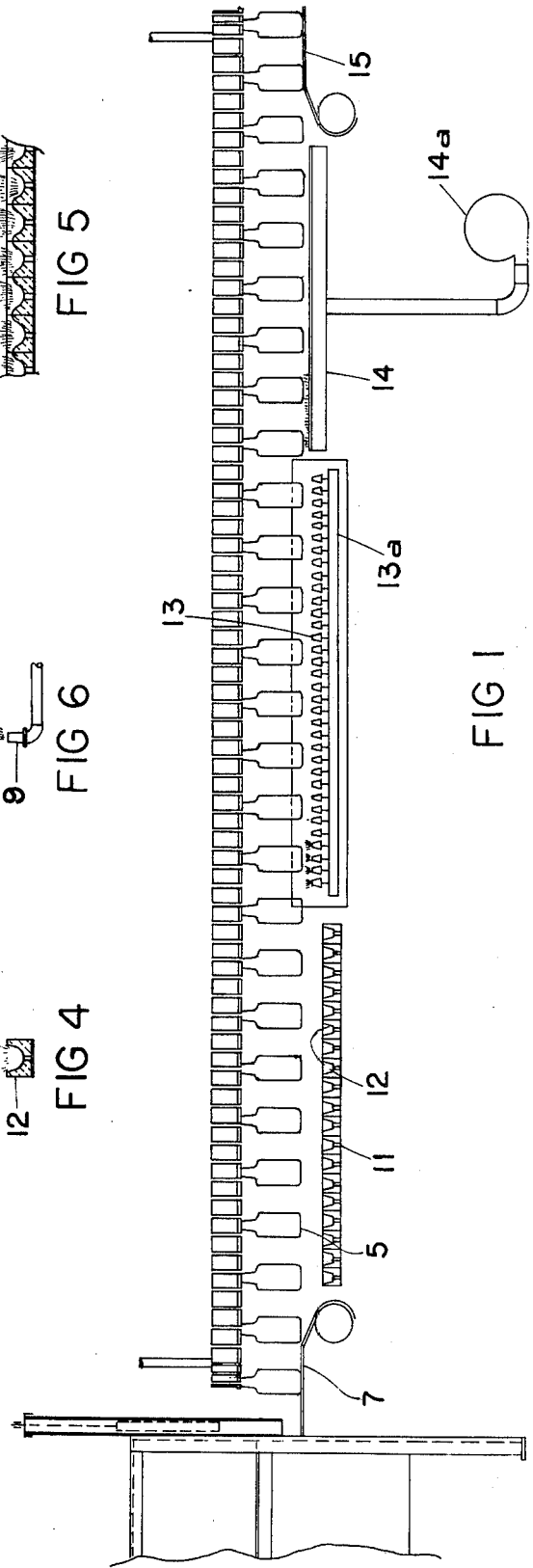
FIG 1

GLASSWARE HANDLING AND TREATING EQUIPMENT

BACKGROUND OF THE INVENTION

The present application relates to glassware handling equipment for the coating of glass containers such as bottles with a protective, non-abrading material that is sprayed on in liquid or powder form in the manner disclosed in U.S. Pat. No. 3,765,856 issued to me Oct. 16, 1973. My earlier patent is directed to the transfer of bottles from the forming machine to and through an annealing lehr, with the bottles being thereafter raised from a supporting conveyor to spray the sides and bottom with the coating material without relative movement of the ware and its support. This process leaves the impression of the conveyor surface such as woven wire on the bottom of the bottle because it is placed on the conveyor before the coating is set or matured. By means of the present invention the coating material on the base or bottom of the glassware is matured after it is sprayed on.

SUMMARY OF THE INVENTION

The glassware handling and maturing equipment in accordance with the present invention maintains the flow of glass bottles from the forming machines and through the lehr without interruption. Supplemental heating and cooling equipment are in the line of movement of the ware after it has passed through the annealing and spraying cycle, with the ware being suspended so as to remove surface irregularities on the coating on the bottom of the bottles.

Accordingly, the principle object of this invention is to provide means for obtaining a non-abrading uniform surface coating on the outside surface of glass bottles and the like.

Another object of this invention is to encapsulate glass bottles in non-abrading coating material having a smooth surface of substantially uniform thickness on substantially their entire outer surface to render them safe for handling when charged with carbonated or other pressure fluids.

It is a further object of this invention to assure separate heating and cooling means for maturing the outside surface of the base or bottoms of the bottles.

These and other objects of the invention will be apparent from the description which follows and the accompanying drawing.

BRIEF DESCRIPTION OF THE DRAWING

FIG. 1 is a side elevational view of a parallel conveyor with gripping means engaging the neck or finish of the bottles and conveying them in suspension successively over a heating panel, a cooling spray and a water-removing blast of air;

FIG. 2 is a top plan view of the conveyor, FIG. 1;

FIG. 3 is a fragmentary, cross-sectional view, partially in elevation, of the conveyor support and bottle engaging linkage of the conveyor shown in FIGS. 1 and 2;

FIG. 4 is an end elevation partially in section of the bottle shown in FIG. 3 suspended over a radiant heat panel of burners;

FIG. 5 is a side elevational view of the bottles suspended from the conveyor and passing over a plurality of the burners shown in FIG. 4; and, FIG. 6 is a diagrammatic view partially in elevation and partially in section of a bottle exposed to spray nozzles for spraying non-abrading coating materials on the outside including a portion of the neck and the base of the bottle, as disclosed in my earlier U.S. Pat. No. 3,765,856 referred to above.

DESCRIPTION OF THE PREFERRED EMBODIMENT

In the several figures of the drawing the numerals 1 and 1a designate a pair of beams having parallel tracks 1b and 1c for supporting the conveyor consisting of a pair of endless chains 2 and 2a with grippers 3 constituting spring fingers that are juxtaposed and biased toward each other where the conveyors merge adjacent the conveyor from the annealing lehr. The grippers 3 engage the neck 4 of a bottle 5 by which it is suspended from the endless conveyor chain.

As shown in FIG. 2 the conveyor 7 conveys the bottles from the discharge end of an annealing lehr L after which they are sprayed by nozzles 8 and 8a which coat the sides and neck of the bottles and a spray 9 for coating the base 10 of the bottle, as shown in FIG. 6 and disclosed in my aforementioned patent. They are then gripped by the fingers 3 and passed over a panel 11 of radiant heaters, there being a sufficient number of the individual burners 12 to generate enough heat to heal over any impressions or marks left on the coating on the bottom of the bottles by the conveyor 7, which usually is of wire mesh construction.

When the bottles 5 have passed over the burners 12, the bottoms of the bottles are exposed to a water cooling spray from nozzles 13 which are supplied by a manifold 13a. There are a sufficient number of nozzles 13 to cause the plastic coating material on the bottoms of the bottles to set. The bottles pass from the coolant spray over an air blast distributor 14 having a slot or perforations to blow the water remaining on the bottles away from the bottles so that they are matured and dry as they pass over and are deposited on a conveyor belt 15 by which they are carried for further treatment or to an inspection table where they are removed for packing. A blower fan 14a delivers the air blast to the slotted air distributor 14.

It will thus be seen that the only equipment needed for maturing the coating on the base of the bottles is the burner panel 11 which reheats the base and which may comprise fire polishing burners, spray nozzles 13 which provide the coolant, and blower 14a which supplies drying air through the slotted nozzle 14.

The spray mechanism shown in FIG. 6 has been disclosed in my former patent mentioned above and the present invention is not directed to any spraying method but to apparatus that supplements the apparatus shown in my earlier patent.

It will thus be seen that the present invention insures a non-abrading coating on the entire outer surface of the bottle, including the base. The invention is also applicable to coating the base or bottom of the bottles if they have been provided with a plastic sleeve which is shrunk on the body of the bottle by means of heat, leaving the base exposed.

Although one embodiment of the invention has herein been illustrated and described, it is obvious that modifications may be made in the details of construction without departing from the principles herein set forth.

I claim:

1. Apparatus for maturing a spray coating applied to bottles following annealing comprising
   a. conveyor means adapted to be positioned at the outlet end of an annealing lehr,
   b. gripping means on said conveyor means for gripping only the neck of said bottles and suspending said bottles while moving the length of the conveyor,
   c. heating means for heating the base of the bottles while suspended to remove surface irregularities caused by supporting the coated bottoms of the bottles before the coating is set or matured,
   d. spray means downstream of said heating means for applying a coolant to the bottom of the bottles after the same have passed over said heating means, and
   e. blower means downstream of said spray means for removing the coolant previously sprayed on the bottoms of said bottles.

2. The apparatus of claim 1 wherein said conveyor means comprises a pair of endless conveyor chains and said gripping means comprises spring clips attached to each of said conveyor chains and in juxtaposition at the inside runs of said conveyor chains where the chains are adjacently disposed, said spring clips having inwardly directed end portions which engage under and thus suspend the necks of the bottles while traversing the length of said conveyor chains.

3. The apparatus of claim 2 wherein said conveyor chains are supported by a pair of bars extending in parallel relation from said annealing lehr, said bars having slots for receiving guide rolls of said conveyor chains, said spring clips when said conveyor chains pass through said slots in said bars being cammed and engaging the necks of the bottles thereby suspending the same.

4. The apparatus of claim 1 wherein said heating means comprises a panel of burners located below said bottles when suspended, and said spray means comprises a plurality of nozzles connected to a source of water which acts as the coolant.

5. A method of removing surface irregularities from the bottom of bottles having a nonabrading coating thereon comprising the steps of:
   a. gripping said coated bottles by the necks thereof so as to suspend said bottoms thereby exposing the bottoms thereof, and conveying the bottles when so gripped,
   b. heating the bottoms of said bottles when so suspended to remove the surface irregularities,
   c. applying a coolant to the bottoms of said bottles when so suspended following heating so as to set the treated surface, and
   d. drying the cooled bottom surface of said bottles while suspended, whereby the bottoms of said bottles are matured.

* * * * *